March 15, 1960 C. L. RUTHROFF 2,928,940

FREQUENCY DISCRIMINATOR

Filed Oct. 17, 1956 2 Sheets-Sheet 1

INVENTION
C. L. RUTHROFF
BY Roy M. Porter Jr.
ATTORNEY

March 15, 1960 C. L. RUTHROFF 2,928,940

FREQUENCY DISCRIMINATOR

Filed Oct. 17, 1956 2 Sheets-Sheet 2

INVENTOR
C. L. RUTHROFF
BY Roy M. Porter, Jr.
ATTORNEY 2,928,940

FREQUENCY DISCRIMINATOR

Clyde L. Ruthroff, Fair Haven, N.J., assignor to Bell Telephone Laboratories, Incorporated, New York, N.Y., a corporation of New York Application October 17, 1956, Serial No. 616,523

6 Claims. (Cl. 250—31)

This invention relates to circuits which are responsive to frequency variation and more particularly to frequency discriminators.

Frequency-modulation transmission systems require demodulating means in order to utilize the information borne by the frequency-modulated energy. This function is provided by the frequency discriminator which produces a unidirectional output voltage which is proportional to, and the sign of which is determined by, the deviation of a frequency-modulated signal from a reference frequency, $f_0$, namely, the carrier frequency. In performing this function effectively, two significant performance criteria are involved. The first is the strength of the discriminator output signal relative to the deviation from the carrier frequency of the frequency-modulated input signal. The second is the accurate recovery of the information from the frequency-modulated signal. A critical factor in the second criterion is the amplitude linearity of the discriminator output, i.e., the linearity of the discriminator frequency response characteristic.

In general, frequency discriminators convert an input frequency-modulated carrier signal to an amplitude-modulated carrier signal by virtue of a frequency-sensitive phase shifting device and hybrid action. The amplitude-modulated carrier is subsequently converted to an audio or video signal whose amplitude is proportional to frequency deviation of the input signal from the carrier by virtue of two detecting means which are usually crystal rectifiers. The detectors are disposed in series opposition so that at the carrier frequency (wherein the amplitude of the wave energy exciting each detector is the same) equal and opposite unidirectional output voltages are produced which result in a net output of zero. At frequencies above or below the carrier (wherein the amplitude of the wave energy exciting one detector is different from that exciting the other detector) the amplitude output of one of the detectors will dominate that of the other and accordingly the net output will be other than zero, being positive or negative, depending upon which detector output dominates. In order for the net output of the detectors (the discriminator output) to accurately convey the information initially carried in the frequency-modulated signal, the voltage amplitude of each detector output must be related to the magnitude of the power exciting it in a specific way. The most desirable detector characteristic is that in which the voltage amplitude of each detector output is rigorously proportional to the power exciting it. With two detectors having this characteristic, the discriminator response is then rigorously proportional to frequency deviation about the carrier. A crystal detector having this characteristic is "square-law" in its response. However, it is well known that crystal rectifiers provide a linear output for only relatively small values of input signals. As a consequence, the linearity of the discriminator frequency-response characteristic is stringently limited.

Therefore, it is in an object of this invention to obtain maximum linearity for a given discriminator output amplitude over any given frequency band.

It is another and corollary object of this invention to provide maximum discriminator output amplitude for any given discriminator response linearity.

It is well known that the characteristics of detectors vary between that of the "square-law" case and that of the "linear" case outside the small region of normal "square-law" operation. In the case of a "square-law" detector the output voltage is equal to the input power mutliplied by some constant, $V=gP$. In the case of "linear" detectors, the output voltage is equal to the square root of the input power multiplied by the appropriate constant, $V=gP^{1/2}$. However, the detector characteristic of any given detector may fall at any point between this range, that is, the exponent of P may assume a value somewhere between ½, the "linear" case, and one, the "square-law" case.

It is accordingly an additional object of this invention to achieve the above-mentioned objects with matched detectors having any characteristic whatsoever.

As an example of the application of the invention there is disclosed a frequency discriminator having an input frequency-modulated signal. The input signal is divided equally between two transmission paths. One of these transmission paths has associated with it a microwave circuit which provides a frequency-responsive phase shift to the wave energy in that path. Thus, half the input energy, in its propagation through one of the paths, experiences a frequency-dependent phase shift relative to the energy propagating through the other transmission paths. The energy of the two paths is recombined in a new phase relationship, by appropriate means, with the energy of each transmission path dividing equally between two different transmission paths, each one of which includes a matched detector. The amount of energy exciting each detector, however, is a vector function of the phase relationship introduced by the microwave circuit; the detectors will be excited by equal amounts of energy only at the carrier frequency, $f_0$.

In accordance with the invention it has been discovered that the frequency-sensitive, phase-shifting microwave circuit of the discriminator may be designed so as to compensate for any nonlinearity resulting from detectors having other than "square-law" characteristics. In particular this frequency-sensitive phase-shifting circuit may be a microwave circuit comprising two resonant cavities separated by one-quarter wavelength of the carrier frequency. It has been discovered that when two cavities are employed as required by the invention, the loaded Q's of the cavities may be proportioned one to the other, relative to the characteristic of the detectors, so as to produce any desired amount of discriminator output linearity for matched detectors having any given characteristic and that the output of the discriminator for any given linearity is substantially greater than is achieved in any known discriminators of the prior art. In particular it has been found that when the detectors are other than "square-law," the loaded Q of one cavity must have a different value from that of the other resonant cavity. The specific relationship of the loaded Q's and detector characteristics will be discussed below in detail.

These and other objects and features of the present invention, the nature of the invention and its advantages will appear more fully upon consideration of the various specific illustrative embodiments shown in the accompanying drawings and in the following detailed description.

Figure 1:
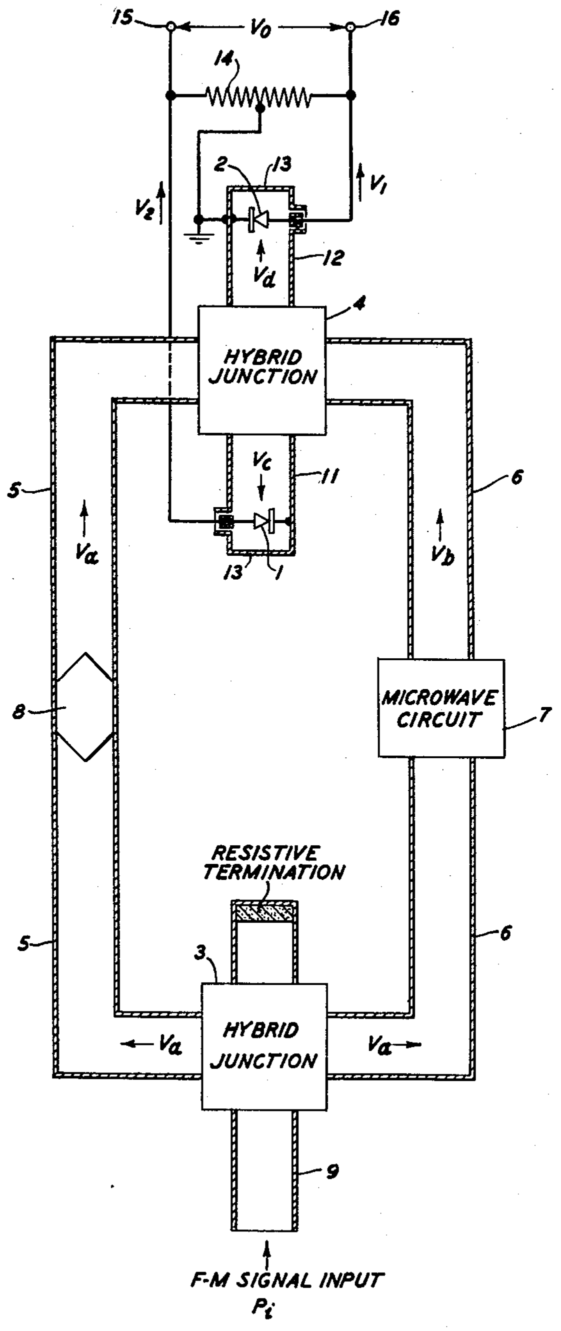
Fig. 1 is a diagrammatic representation of an illustrative example of a frequency discriminator in accordance with the invention.

As shown in Fig. 1, the frequency discriminator comprises two hybrid wave guide junctions 3 and 4 each having a pair of conjugate points with two transmission paths 5 and 6 whose input ends are respectively coupled to the conjugate points of hybrid 3 and whose output ends are respectively coupled to the conjugate points of hybrid 4, and a frequency-sensitive phase-shifting microwave circuit 7 associated with transmission path 6. Each of transmission paths 5 and 6 may be constituted by a metallic wave guide of the hollow pipe type having a rectangular cross section. In wave guide path 5 is disposed a frequency-insensitive phase-shifting element 8. As explained more fully below, the frequency-sensitive phase-shifting network 7 in wave guide 6 is designed to provide a $\pi/2$ radians phase shift, or an odd integral multiple thereof, at the carrier frequency $f_0$, to the wave energy in wave guide path 6 relative to wave energy in wave guide path 5 propagating past frequency-insensitive phase-shifting element 8. Transmission paths 5 and 6 are equal to each other in physical length and cross section so that any phase differential introduced between the two paths is solely a function of circuit 7 and element 8.

Electromagnetic wave energy at the carrier frequency, $f_0$, from a suitable source, not shown, is introduced at the input wave guide branch 9 of hybrid 3. In the present example, the operating mode is the dominant transverse electric mode, usually designated $TE_{10}$. This mode is chosen because for any given frequency it may be transmitted in a wave guide of minimum cross section. Because of the nature of a matched hybrid junction, as is well known, the wave energy in input branch 9 will be equally divided between wave guides 5 and 6.

Frequency-sensitive phase-shifting circuit 7 comprises two resonant cavities separated by one-quarter wavelength of the carrier frequency. Each cavity of circuit 7 is tuned to resonance at the same frequency, $f_0$. Because of the nature of circuit 7, the details of which will be presented hereinafter with respect to Fig. 3, wave energy in wave guide path 6 will experience approximately a 180 degree excess phase shift at the carrier frequency, $f_0$. The frequency-insensitive phase-shifting element 8 in wave guide path 5, which may be of the dielectric vane type or any other of the phase-shifting devices well known in the art, provides an excess phase shift of approximately 90 degrees such that the phase difference between the wave energy in paths 5 and 6 on reaching hybrid 4 will be exactly 90 degrees or an odd integral multiple thereof. It is to be understood that phase-shifting element 8 need only be frequency-insensitive over the frequency band of interest, i.e., the frequency band of the frequency-modulated input signal. Circuit 7 to the contrary, however, is definitely frequency-sensitive in this band.

Hybrid junction 4 comprises four branches, two of which are the opposing wave guide paths 5 and 6. Branches 11 and 12 may also be metallic hollow type wave guides of rectangular cross section oppositely disposed relative to hybrid junction 4 and are of equal lengths, each being terminated at its outer end by a conductive plate 13. Wave energy entering hybrid 4 from each of wave guide paths 5 and 6 is divided between branches 11 and 12, in a manner hereinafter to be discussed, and is rectified by means of crystal detectors 1 and 2. Crystal detectors 1 and 2 are mounted respectively in branches 11 and 12 near the outer ends thereof at a proper distance from conductive plate 13 to appropriately provide good impedance match. A wire lead is connected to each of detectors 1 and 2 through by-pass condensers which are of the type well known in the art comprising a grounded cylindrical outer electrode and a concentric inner electrode conductively connected to the wire lead. The electrodes are separated by a dielectric which may be air. In series with each of detectors 1 and 2 and external to the wave guide branches 11 and 12, is a load resistor which is grounded at its midpoint. It may be noted that wave guide branches 11 and 12 are also grounded. Rectified energy from each of detectors 1 and 2 will be propagated respectively in opposite directions to each other through resistor 14 whose two halves are in series opposition due to the grounding of the midpoint. Output terminals 15 and 16 may be provided respectively at opposite ends of resistor 14.

The operation of the frequency discriminator may now be discussed. Input energy in branch 9 divides into two equal portions by virtue of the action of matched hybrid 3, which equal portions are transmitted along wave guide paths 5 and 6, respectively, and impressed upon conjugate points of hybrid junction 4 in phase quadrature when the input energy is at the carrier frequency, $f_0$, to which each cavity of circuit 7 is tuned. The portion of the energy entering hybrid junction 4 from path 5 again divides in equal portions which flow in branches 11 and 12, respectively, in phase with the energy in path 5. The portion of energy entering hybrid junction 4 from path 6 also divides into equal portions which flow in branches 11 and 12, respectively. The portion of the energy from path 6 entering hybrid 4 is precisely 90 degrees, or an odd integral multiple thereof, out of phase with the energy entering hybrid 4 from path 5. Therefore in each of branches 11 and 12 the energy from path 6 will be in quadrature with an equal amount of energy from path 5. The unidirectional output voltages from detectors 1 and 2 are proportional to the vector sums of the energy in branches 11 and 12, respectively. However, since the terminals of detectors 1 and 2 are connected in a series opposing relationship by virtue of the grounding of the midpoint of load resistor 14, equal and opposite voltages will appear between output terminals 15 and 16. If load resistor 14 were a voltmeter or other indicating device, it would show a zero reading. Now, if the input signal is other than at the carrier frequency, $f_0$, to which both cavities of circuit 7 have been tuned, circuit 7 will introduce into path 6 an excess phase shift which is greater or less than 180 degrees depending upon whether the frequency is greater or less than $f_0$. Therefore, relative to the wave energy in path 5, the wave energy in path 6 will differ in phase by an amount greater or less than 90 degrees depending upon whether the frequency is greater or less than $f_0$. Consequently, the vector relationship in branch 11 is different from that in branch 12. In one branch the angle between the two vector components becomes acute and the vector sum or magnitude is increased, while in the other branch the angle between the vector components becomes obtuse and the vector sum is decreased. As a result, the output voltage from one of the detectors 1 or 2 increases while that from the other decreases, providing a net positive or negative potential $V_0$, across the output terminals 15 and 16.

In prior art frequency discriminators this voltage would be substantially proportional to the difference between the input frequency and $f_0$, but only for small deviations from $f_0$. Curve 17 of Fig. 2 indicates this relationship. However, because of the nature of circuit 7, in accordance with the invention, this linear proportionality between the frequency deviation and the net voltage output of the detectors, $V_0$, may be maintained for any magnitude of frequency deviation desired, as indicated by curve 18 of Fig. 2, or, alternatively, for any given linearity a greater output sensitivity may be obtained.

Figure 3:
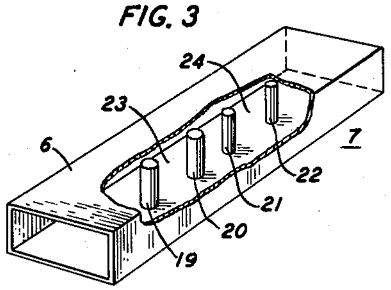
Fig. 3 is a perspective view of the microwave circuit of the discriminator of Fig. 1.

Let us now consider, then, the nature of the double resonant cavity phase-shifting circuit 7 as disclosed in Fig. 3 for illustrative purposes. A hollow pipe rectangular wave guide section is therein disclosed which constitutes a portion of the transmission path 6 of Fig. 1. Disposed parallel to the narrow walls of wave guide 6 and perpendicular to the wide walls thereof are four metallic posts serially located on the longitudinal axis of guide 6. The first two posts 19 and 20 are of equal diameter. The second two posts 21 and 22 are of equal diameter to each other but smaller than the diameters of posts 19 and 20. Posts 19—20 and 21—22 define resonant cavities 23 and 24, respectively, in guide 6, which cavities are separated from each other by one-quarter wavelength of the carrier frequency, that is, post 20 is separated from post 21 by one-quarter wavelength. The dimensions of these inductive posts, as is well known, determine the loaded Q's of their respective cavities and also largely affect the amount of excess phase shift experienced by the wave propagated therethrough. Each one of these four reactive elements will produce approximately a 45 degree excess phase shift, more or less, depending upon the precise dimension of the post. This results in a total of approximately 180 degrees excess phase shift which will be in a leading sense because the reactances are inductive. The frequency-insensitive phase-shifting element 8 in path 5 of Fig. 1 is adjusted so that the relative phase shift between the two arms will be exactly 90 degrees or an odd integral multiple thereof. That is, the frequency-sensitive excess phase shift produced in path 6 by circuit 7 now being discussed, minus the excess phase shift produced by element 8 in path 5 is exactly equal to $n\pi/2$ at $f_0$, where $n$ is any odd integer.

It may be seen from the above discussion that the loaded Q's of the two cavities are different. It is the relationship of the ratio of the Q's to the detector characteristics that provides the advantages of the invention discussed above. The determination of this relationship and its exact nature will be presented below. However, it may be seen that only after this relationship is obtained may the excess phase-shift properties of the resonant cavities 23 and 24, and also the phase-shift element in path 5 be adjusted for functioning in the discriminator. Both cavities, it is to be understood, are resonant at the same frequency, namely, the carrier frequency, $f_0$. The relationship of the dimensions of the posts in terms of the loaded Q's of the cavities relative to the detector's characteristic will now be discussed.

To obtain expressions for the discriminator response linearity and frequency sensitivity we must derive an equation for the net voltage output, $V_0$, of the discriminator. The linearity will be determined by a factor of the equation for $V_0$, while frequency sensitivity is obtained by differentiating the equation for $V_0$ with respect to frequency, i.e., frequency sensitivity is equal to the rate of change of $V_0$ with frequency, $dV_0/df$.

$V_0$ will be a function of input power, the detector law of the detectors used, and the transmission characteristic of circuit 7. For the discussion that follows, reference to the voltage wave designations at different points of the discriminator of Fig. 1 should prove helpful. In the discussion, V with a lettered subscript represents a voltage wave traveling in the direction indicated in Fig. 1. These voltages are normalized so that the power P of the wave is equal to $VV^*=|V|^2$, where * designates the complex conjugate.

Input power $P_i$ entering hybrid 3 will result in equal voltage waves $V_a$ in paths 5 and 6. The input power thus being $$P_i=2V_aV_a^*=2|V_a|^2 \tag{1}$$

A voltage transmission coefficient T is then defined for circuit 7:

$$\frac{V_b}{V_a}=-jT \tag{2}$$

where $V_b$ is the voltage wave output from circuit 7 and $-j$ provides for the difference in phase shift between transmission paths 5 and 6 at the carrier frequency, $f_0$. $V_a$ from path 5 and $V_b$ from path 6, which are $n\pi/2$ radians out of phase with each other, then enter hybrid 4. The characteristic equations of a matched hybrid needed here are:

$$\sqrt{2}V_c=V_a+V_b,\quad \sqrt{2}V_d=j(V_a-V_b) \tag{3}$$

where $V_c$ is the wave excited in branch 11 containing detector 1 and $V_d$ is the wave excited in branch 12 containing detector 2. The direct-current output voltages of detectors 1 and 2 are respectively:

$$\begin{aligned} V_1&=gP_c^k=g(V_cV_c^*)^k \\ V_2&=gP_d^k=g(V_dV_d^*)^k \end{aligned} \tag{4}$$

where $g$ is an appropriate constant. Since the detector law may be between "square" and "linear," $k$ is some value between ½ and one inclusive, $\frac{1}{2}\leq k\leq 1$. By substituting Equations 1 through 3 into Equations 4 the expressions for the outputs of detectors 1 and 2 become:

$$\begin{aligned} V_1&=gP_c^k=\frac{g}{2^k}[(V_a+V_b)(V_a^*+V_b^*)]^k \\ &=\frac{g}{2^k}\left(\frac{P_i}{2}\right)^k[1+TT^*-2Im(T)]^k \\ V_2&=\frac{g}{2^k}\left(\frac{P_i}{2}\right)^k[1+TT^*+2Im(T)]^k \end{aligned} \tag{5}$$

Because of the series-opposing relationship of the output circuit of the detectors, the net resultant discriminator voltage output, $V_0$, is equal to $V_1-V_2$ and thus, using Equations 5:

$$V_0=V_1-V_2=\frac{g}{2^k}\left(\frac{P_i}{2}\right)^k[[1+TT^*-2Im(T)]^k-[1+TT^*+2Im(T)]^k] \tag{6}$$

Figure 2:
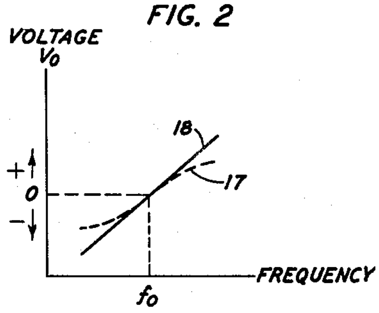
Fig. 2 is a graphical representation, given for the purpose of explanation, of two discriminator frequency-response characteristics, one of which is in accordance with the invention.

At this point, it should be noted that $P_i$, the input power to the discriminator, is not a function of frequency. For the purposes of Equation 6 it is some constant value which is applied to the input of the discriminator. Consequently the expression to the left of the large bracketed function of T is a constant and the only factor that can contribute to the nonlinearity of $V_0$ is the bracketed function of T. In this context linearity may be roughly considered as the change in slope of the $V_0$ versus frequency curve (Fig. 2). If the slope of this curve has a maximum change of X% in the band of interest, then the linearity is said to be X% for this frequency deviation. The corresponding decimal linearity, L, equals $X/100$. More precisely, the linearity of the discriminator is defined by the equation:

$$L=\left|\frac{\left.\frac{dV_0}{df}\right|_{\max.}-\left.\frac{dV_0}{df}\right|_{\min.}}{\left.\frac{dV_0}{df}\right|_{\max.}}\right| \tag{7}$$

where max. means the maximum value of the derivative and min. the minimum value of the derivative in the range of interest of frequency deviation from $f_0$. Equation 7 may be expressed, in accordance with filter theory, in terms of the loaded Q's of circuit 7, $Q_1$ and $Q_2$, and in terms of the bandwidth of interest, $$\left(\frac{\omega}{\omega_0}-\frac{\omega_0}{\omega}\right)$$

where $\omega_0=2\pi f_0$, and $\omega=2\pi f$. This is accomplished by expanding the expression involving T of Equation 6 in a power series and setting as many as is possible of the coefficients of the nonlinear terms thereof equal to zero, in the manner comparable to that of maximally flat filter theory (for details thereof, reference may be had to "Maximally-Flat Filters in Waveguides," by W. W. Mumford, Bell System Technical Journal, volume 27, pages 684 to 713, October 1948). Substituting this modified form of Equation 6 into Equation 7 we have:

$$L \doteq -\frac{\left[Q_1\left(\frac{\omega}{\omega_0}-\frac{\omega_0}{\omega}\right)\right]^2}{2}\left[(6k-k^2+1)\left(\frac{Q_2}{Q_1}\right)^2 -2(5+k^2)\left(\frac{Q_2}{Q_1}\right)+(6k-k^2+1)\right] +5\left[Q_1\left(\frac{\omega}{\omega_0}-\frac{\omega_0}{\omega}\right)\right]^4\left[\frac{\left(\frac{Q_2}{Q_1}-1\right)^4(2+5k+k^2)}{8} -2\left(\frac{Q_2}{Q_1}\right)^2(1+k) +\frac{\left[\left(\frac{Q_2}{Q_1}\right)+1\right]^2\left[\left(\frac{Q_2}{Q_1}\right)-1\right]^2[k^2-3k+2[[9-k]}{12}\right] \quad (8)$$

It may be noted that the bandwidth expression $$\left(\frac{\omega}{\omega_0}-\frac{\omega_0}{\omega}\right)$$

is a very small fraction indeed. Therefore the bandwidth expression raised to the fourth power in Equation 8 is a much smaller number than the bandwidth expression squared. Since maximum linearity requires minimizing L, it would be most advantageous to remove the squared bandwidth expression. This is readily accomplished. It may be noted that the coefficient of the squared bandwidth expression is a quadratic function in $$\left(\frac{Q_2}{Q_1}\right)$$

Therefore, the coefficient may be made equal to zero by solving the quadratic equation. A value of $$\left(\frac{Q_2}{Q_1}\right)$$

is thus derived which eliminates the squared band-width expression. The solution of the quadratic equation is represented in graphical form in Fig. 4 for all values $\frac{1}{2} \leq k \leq 1$. Thus for any detector characteristic we have the appropriate ratio of the loaded Q's, $$\left(\frac{Q_2}{Q_1}\right)$$

that will provide maximal output linearity. It is of interest to note that Fig. 4 demonstrates that for "square-law" detectors, i.e., $k=1$, the quadratic equation is solved when $$\frac{Q_2}{Q_1}=1$$

i.e., when the two cavities of circuit 7 have equal loaded Q's.

With a value for $$\left(\frac{Q_2}{Q_1}\right)$$

obtained which satisfies the quadratic equation, Equation 8 for L degenerates into $$\left[Q_1\left(\frac{\omega}{\omega_0}-\frac{\omega_0}{\omega}\right)\right]^4$$

multiplied by an involved coefficient in $k$ and $$\left(\frac{Q_2}{Q_1}\right)$$

Figure 5:
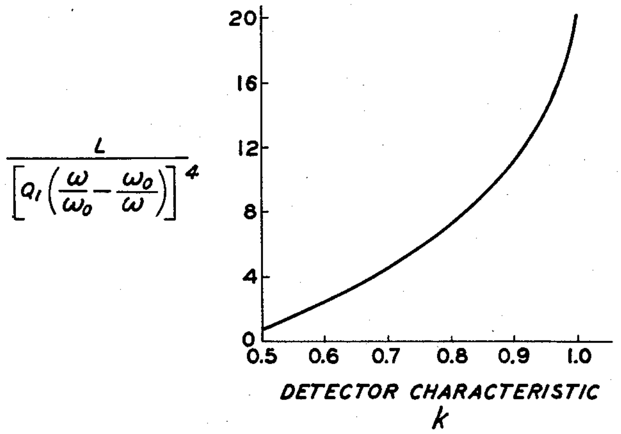
Fig. 5 is a graphical representation, given for the purpose of explanation, of another parameter of the microwave circuit of Fig. 3, this parameter being dependent upon that of Fig. 4 in accordance with the invention.

With this expression, the remaining variable, $Q_1$ may then be solved, and $Q_2$ is immediately available. Fig. 5 represents a graphical representation of the solution for $$\frac{|L|}{\left[Q_1\left(\frac{\omega}{\omega_0}-\frac{\omega_0}{\omega}\right)\right]^4}$$

Figure 4:
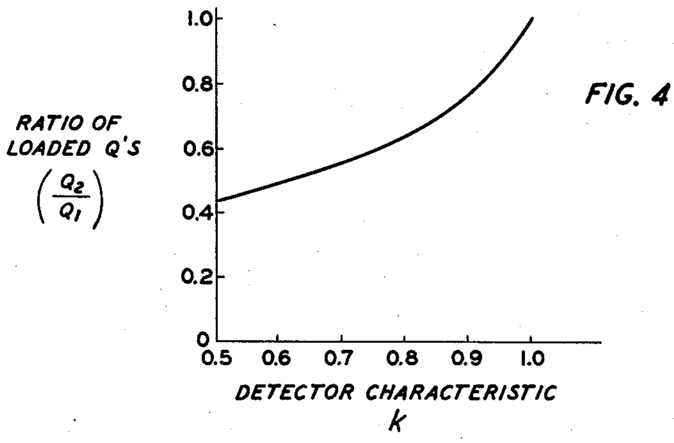
Fig. 4 is a graphical representation, given for the purpose of explanation, of a parameter of the microwave circuit of Fig. 3 relative to various detector characteristics, in accordance with the invention.

The entering argument is the detector characteristic $k$. Then the appropriate $Q_1$ for any given linearity, L, and bandwidth $$\left(\frac{\omega}{\omega_0}-\frac{\omega_0}{\omega}\right)$$

is available. With $$\left(\frac{Q_2}{Q_1}\right)$$

obtained from Fig. 4, $Q_2$ is then also solved.

In actual practice, then, setting up the discriminator involves ascertaining the detector characteristic, $k$, for the two detectors (which should be substantially equal and thus interchangeable as good engineering practice dictates), obtaining the values of the loaded Q's in the manner just described which define the required reactances of the cavities and thus the dimensions of the inductive posts, and then adjusting the lengths of the resonant cavities for resonance at the carrier frequency, $f_0$. With this established, phase shift element 8 in path 5 may be adjusted so that energy from path 6 is exactly 90 degrees (or an odd integral multiple thereof) out of phase with energy from path 5 on entering hybrid 4, at $f_0$. This is readily accomplished by adjusting phase-shift element 8 until the net output, $V_0$, of the discriminator is zero at $f_0$.

The frequency sensitivity is readily obtained by differentiating $V_0$, Equation 6, with respect to frequency and results in:

$$\left.\frac{dV_0}{df}\right|_{f=f_0}=\frac{\left(1+\frac{Q_2}{Q_1}\right)Q_1 gk2^{2-k}P_i^k}{f_o} \quad (9)$$

In one particular reduction to practice, at a carrier frequency of 11,030 mc., frequency deviation of ±6 mc., linearity equal to 1%, and detector law of $V=.23P^{.66}$, the net discriminator output, $V_0$, was several decibels greater than any prior art discriminator of which I am aware. The delay distortion was negligible, being less than 0.5 millimicrosecond.

The double resonant cavity circuit 7 shown in detail in Fig. 3, is represented as having inductive posts. However, for the purposes of the invention it is relatively immaterial whether the resonant cavities are formed in this manner or by capacitive posts, capacitive irises, inductive irises, or any other of the many resonance devices well known in the art. To be sure, the phase shift that will be introduced by inductive reactances will be leading while that of capacitive reactances will be lagging. Nevertheless, the important consideration is the relative phase relationship between the energy in the paths 5 and 6. As long as this phase difference is an odd integral number of quarter wavelengths at $f_0$, the discriminator action is proper. Consequently the phase shift introduced in path 5 will compensate the phase shift in path 6 so as to provide this phase relationship irrespective of whether the phase shift in path 6 is leading or lagging. Furthermore, and for the same reasons, phase-shift element 8 which is located in path 5 may be alternatively located in path 6 if the structural arrangement of the discriminator suggests its desirability.

In all cases it is understood that the above-described arrangements are simply illustrative of a small number of many possible specific embodiments which can represent applications of the principles of the invention. Numerous and varied other arrangements can readily be devised in accordance with said principles by those skilled in the art without departing from the spirit and scope of the invention.

What is claimed is:

1. Apparatus responsive to frequency-modulated wave energy comprising two transmission paths each supportive of said wave energy, a circuit disposed in one of said paths comprising two portions resonant to the same frequency and separated by one-quarter wavelength at said frequency, said portions having loaded Q's of different magnitudes designated $Q_1$ and $Q_2$, respectively, the ratio of $Q_2/Q_1$ defining a parameter of said apparatus, means to combine wave energy from said paths, and two detecting means coupled to said combining means.

2. A combination as recited in claim 1 including means for dividing said frequency-modulated wave energy into two components of equal amplitude, and for coupling one of said equal components to one of said transmission paths and the other of said components to said other transmission path.

3. A combination as recited in claim 1 wherein each of said detecting means provides a voltage output, V, proportional to the wave power, P, in said combining means respectively exciting each of said detecting means, said proportionality being represented by the expression $V=gP^k$, where $g$ is a constant, and said exponent $k$ having some value less than the value 1.

4. A combination as recited in claim 3 wherein said ratio $Q_2/Q_1$ approximately satisfies the quadratic equation.

$$\left(\frac{Q_2}{Q_1}\right)^2(6k-k^2+1)-2\left(\frac{Q_2}{Q_1}\right)(5+k^2)+(6k-k^2+1)=0$$

5. A combination as recited in claim 3 wherein said value $k$ may be any value within the range of positive numbers less than 1, and said ratio $Q_2/Q_1$ has a unique value for each point in said range, said unique values describing a monotonic rising function versus $k$ over said range.

6. Apparatus responsive to frequency variations in electromagnetic wave energy comprising a first and a second matched hybrid junction, said hybrid junctions each having a pair of conjugate points, a first transmission path coupling said first hybrid at one of its conjugate points to said second hybrid at one of its conjugate points, a second transmission path coupling said first hybrid at the other of its conjugate points to said second hybrid at the other of its conjugate points, a frequency-sensitive phase-shifting circuit disposed in one of said transmission paths, said phase-shifting circuit comprising two portions resonant to the same frequency and separated by one-quarter wavelength at said frequency, a frequency-insensitive phase-shifting element associated with the other of said transmission paths, the wave energy exciting said circuit having an $n\pi/2$ radians phase difference at a given frequency relative to wave energy exciting said element, where $n$ is any odd integer, said second hybrid junction having first and second conductively terminated branches, a detecting means disposed in each of said branches and matched thereto, and a lumped parameter circuit disposed external to said branches and coupled to said detecting means to direct the outputs of said detecting means in series opposition, the loaded Q's of said resonant portions of said frequency-sensitive phase-shifting circuit defining a ratio $Q_2/Q_1$, where $Q_1$ is the loaded Q of one of said resonant portions and $Q_2$ is the loaded Q of the other of said resonant portions, said ratio $Q_2/Q_1$ approximately satisfying the quadratic equation $$\left(\frac{Q_2}{Q_1}\right)^2(6k-k^2+1)-2\left(\frac{Q_2}{Q_1}\right)(5+k^2)+(6k-k^2+1)=0$$

where $k$ is some value fixed by the operating characteristics of each of said detecting means and defined by the expression $V=gP^k$ where V is the voltage output of said detecting means, $g$ is a constant, and P is the wave power exciting said detecting means.

References Cited in the file of this patent

UNITED STATES PATENTS

| | | |
|---|---|---|
| 2,476,311 | Learned | July 19, 1949 |
| 2,691,734 | Beck et al. | Oct. 12, 1954 |
| 2,736,864 | Sinclair et al. | Feb. 28, 1956 |